United States Patent [19]

Sonohara et al.

[11] Patent Number: 5,627,656
[45] Date of Patent: May 6, 1997

[54] MOTION PICTURE REPRODUCING APPARATUS IN SYNCHRONISM WITH SOUND SIGNAL

[75] Inventors: Satoshi Sonohara; Hitoshi Matsumoto; Shigeki Furuta, all of Kawasaki, Japan

[73] Assignee: Fujitsu Limited, Kawasaki, Japan

[21] Appl. No.: 698,172

[22] Filed: Aug. 12, 1996

Related U.S. Application Data

[63] Continuation of Ser. No. 390,425, Feb. 17, 1995, abandoned, which is a continuation of Ser. No. 103,788, Aug. 10, 1993, abandoned.

[30] Foreign Application Priority Data

Nov. 2, 1992 [JP] Japan .................................. 4-294660

[51] Int. Cl.⁶ .............................. H04N 5/91; H04N 5/96; G11B 5/02
[52] U.S. Cl. ........................... 386/96; 358/343; 360/19.8; 386/103
[58] Field of Search ................... 358/341, 343, 358/342, 335, 310; 360/19.1, 32, 33.1

[56] References Cited

U.S. PATENT DOCUMENTS

| | | | |
|---|---|---|---|
| 5,038,217 | 8/1991 | Hayashi et al. | 358/341 |
| 5,130,966 | 7/1992 | Yoshio et al. | 369/49 |
| 5,142,521 | 8/1992 | Terashima et al. | 369/50 |
| 5,262,877 | 11/1993 | Otsuka | 358/343 |

Primary Examiner—Thai Q. Tran
Assistant Examiner—Robert Chevalier
Attorney, Agent, or Firm—Staas & Halsey

[57] ABSTRACT

A motion picture reproducing apparatus having a file composed of a header an image track on which image data have been recorded for a predetermined period of time and a sound track on which sound data have been recorded for the predetermined period of time. The image and sound data of the file are provided with track and data identifying numbers by a track identifying section and a data identifying section, respectively, and are outputted to a data synchronizing section. The data synchronizing section reads in order the image data and the sound data on the basis of the control information of the header, synchronizes the image data and the sound data to which the same data identifying numbers have been imparted with reference to the track and data identifying numbers which have been given to the image data and sound data, and outputs the image and sound data to reproduction units.

6 Claims, 8 Drawing Sheets

FIG.7

| IMAGE HEADER #1-00 | SOUND HEADER #2-00 | SOUND DATA #2-01 | SOUND DATA #2-02 | IMAGE DATA #1-01 | SOUND DATA #2-03 | IMAGE DATA #1-02 | IMAGE DATA #1-03 |
|---|---|---|---|---|---|---|---|

ONE SECOND (spanning #2-01 through #2-03 / image data #1-01)

A

MOTION PICTURE REPRODUCING APPARATUS IN SYNCHRONISM WITH SOUND SIGNAL

This application is a continuation of application Ser. No. 08/390,425, filed Feb. 17, 1995, now abandoned, which is a continuation of application Ser. No. 08/103,788 filed Aug. 10, 1993 now abandoned.

BACKGROUND OF THE INVENTION

The present invention relates to a motion picture reproducing apparatus for recording audio data and video data, in a file and reproducing the data contained in the file for a long period of time, in synchronism with the audio data. Additionally, the present invention relates to a multi-media instrument that can handle motion picture information and sound information and also handle the video information and audio information in the form of a digital coded file.

In this type of motion picture reproducing apparatus, image data of a plurality of frames per unit time may be obtained by picking up a moving object by a CCD (charge coupled device) or the like. The image data of the plurality of frames per unit time may be converted into digital data and recorded in an image file. Simultaneously with the recording operation of the image data, sounds generated in the object are input thereinto, by a microphone or the like, and the audio data is converted into digital data and recorded in an audio file.

Then, when the image and sound are reproduced by using the reproduction apparatus, the image data per unit time is read out from the image file. At the same time, in synchronism with the image data, the audio data per unit time is read out from the audio file. This allows display of the image on a CRT (cathode ray tube) or the like and emitting the sound from a loud speaker or the like.

However, upon the reproduction of the data, the file control is intricate because the audio data and the image data are read out independently from the two files.

Namely, it is necessary to adjust timings for synchronism between the video data and audio data. Also, a load imposed on a microprocessor is increased. In addition, the formation of programs for controlling the two files is intricate.

In view of the foregoing defects inherent in the prior art, an object of the present invention is to provide a motion picture reproducing apparatus in synchronism with the sound, which apparatus is capable of reproducing the video data and audio data contained in the file in synchronism.

SUMMARY OF THE INVENTION

FIG. 1 shows a concept of the invention. A motion picture reproducing apparatus has a file 1 having an image track on which moving image data, included in a plurality of frames for a unit time, have been recorded for a predetermined period of time; a sound track on which sound data have been recorded for a predetermined period of time corresponding to the image data; and a header including control information for controlling the image data and the sound data.

A track identifying means 2 is included for imparting, to the image data and the sound data for every unit time, track identifying numbers for identifying either the image track or the sound track. A data identifying means 3 is included for imparting, to the image data and the sound data for every unit time, data identifying numbers representative of an order of data within the image track and the sound track.

A data synchronizing means 4 is included for reading, in order, the image data and the sound data in the file 1 based on the control information of the header, and at the same time for synchronously outputting the image data and the sound data. Additionally, a reproduction means 5 is included for reproducing the image data and the sound data.

The image and sound data of the file 1 are associated with the track and data identifying numbers for every unit time, by the track identifying means 2 and the data identifying means 3.

The data synchronizing means 4 is included for reading the image data and the sound data of the file 1 in order based upon the control information of the header, and at the same time, for outputting the production means 5 while synchronizing the image and sound data to which the same data identifying numbers have been imparted with reference to the track and data identifying numbers given to the image data and the sound data.

The file 1 may be a file that is formed on recording media such as a hard disc, a magnetic disc and the like. The process of importing data onto the file 1 is preferably as follows.

Namely, a data formation section 13 having the following functions is provided. The data formation section 13 is provided with an image file 11 on which moving image data, included in a plurality of frames for a unit time, have been recorded and a sound file 12 on which the sound data corresponding to the image data for the period of time are recorded. The image track is produced from the image data for the predetermined period of time of the image file 11 and the sound track is produced from the sound data for the predetermined period of time of the sound file 12.

Further, it is possible to provide the header formation section 14, for forming the header, and to form the coupling section 15 for forming the file 1 by coupling the image data on the image track and the sound data on the sound track with each other. The coupling section 15 makes it possible to form the final file 1 having the image track, sound track and header as described before.

The image file 11 and the sound file 12 may be files formed on the recording media such as hard discs and magnetic discs.

The data synchronizing means 4 may comprise a reading section 41 for reading the image data and the sound data from the file 1 and a memory means 42 for storing the image data and the sound data which have been read out by the reading section 41. The data synchronizing means may synchronously reproduce the image data and sound data by using a controller 43 for outputting the data by reading synchronously the image and sound data to which the same data identifying numbers have been given with reference to the track identifying number and the data identifying number stored in the memory means 42.

The memory means 42 may comprise, for example, a main memory and buffer memory that can store therein image and sound data for at least several seconds. The controller 43 may comprise a central processing unit (CPU) and a microprocessor.

The apparatus may further comprise a file compiling section 20 for compiling and processing the file, wherein, when the image data and the sound data are replaced by new image data and/or sound data, the file compiling section commands the track identifying means 2 and the data identifying means 3 so that the track and data identifying numbers which have been given to the old image and/or sound data are imparted to the new image and/or the new sound data.

According to the present invention, a file 1 has an image track on which moving image data, included in a plurality of frames for a unit time, is recorded for a predetermined period of time; a sound track on which sound data is recorded for a predetermined period of time corresponding to the image data, and a header which includes control information for controlling the image data and the sound data. A track identifying means 2 and a data identifying means 3 each impart, to the image data and the sound data for every unit time, the image and sound data of the file 1 for every unit time in association with the track identifying number, respectively and the data identifying number.

Then, the data synchronizing means 4 reads in order the image data and the sound data of the file 1 on the basis of the control information of the header and synchronously reads to the reproduction means 5, the image data and sound data to which the same data identifying numbers have been imparted in reference with the track identifying number and the data identifying number which have been imparted to the image and sound data. The reproduction means 5 may reproduce the image data and the sound data to be synchronous with the image data.

Namely, since the image and sound data are reproduced in synchronism on a single file 1, the number of the file to be controlled may be one to simplify the file control and facilitate the program formation.

BRIEF DESCRIPTION OF THE DRAWINGS

In the accompanying drawings:

FIG. 7 is a diagram showing the produced file format;

DETAILED DESCRIPTION OF THE PREFERRED EMBODIMENTS

Figure 1:
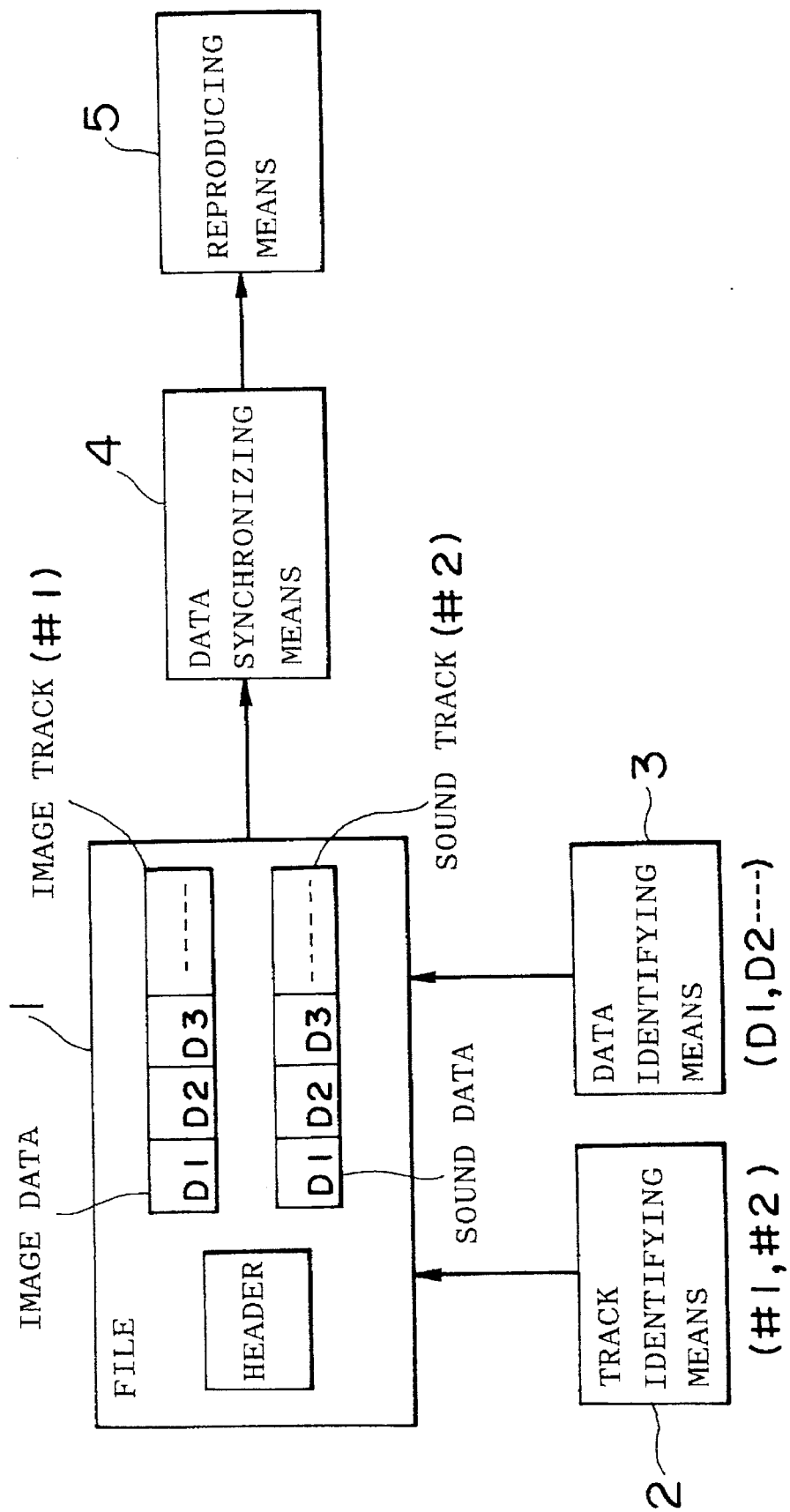
FIG. 1 shows a concept of the invention.
Figure 2:
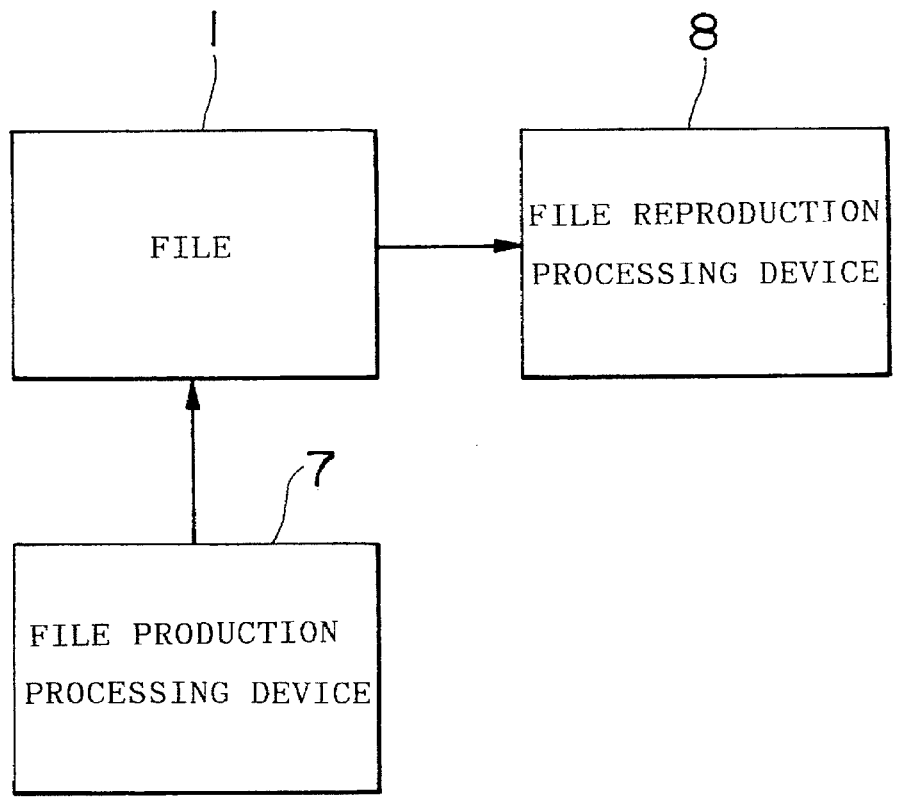
FIG. 2 is a block diagram showing an embodiment of the invention.
Figure 3:
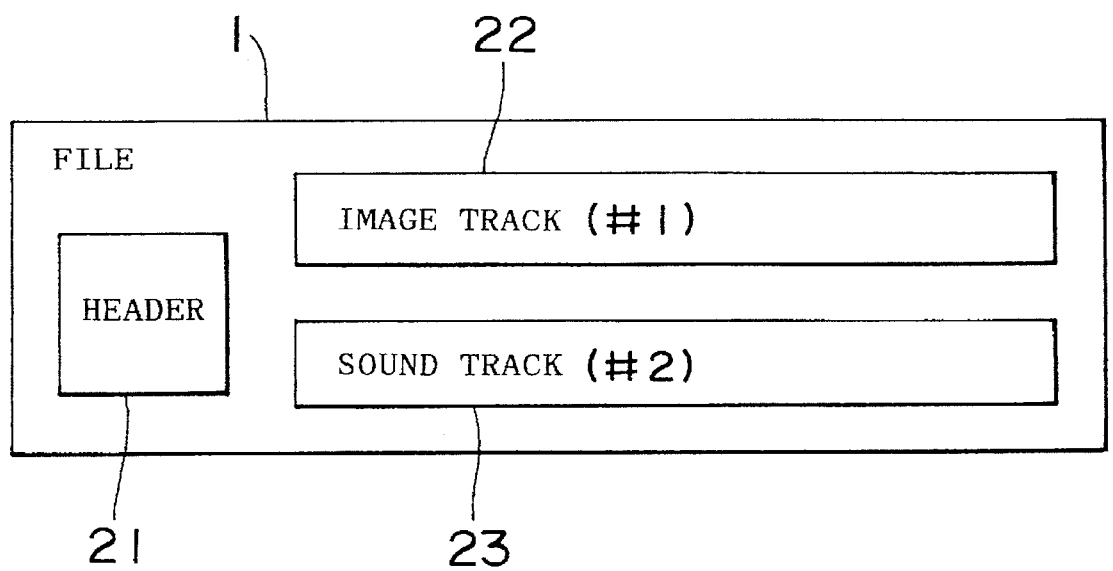
FIG. 3 shows a concept of a file format.

An embodiment of the invention will now be described with reference to the accompanying drawings. FIG. 2 is a block diagram showing a structure of a motion picture reproducing apparatus in accordance with the embodiment of the invention. FIG. 3 is a diagram showing a concept of a file format.

As shown in FIG. 2, the apparatus includes a file 1 into which image data of a moving object and audio data are stored, a file production processing device 7 for producing the file 1, and a file reproduction processing device 8 for reproducing the video data and audio data of the file 1.

The above-described video (or motion picture) data are digitized data which are obtained by picking up a moving object with a CCD (charge coupled device) and are composed of a plurality of frames per unit time. The above-described audio data are digitized data which are obtained by picking up sounds, generated from the object, with a microphone or the like.

The above-described file 1 is a file formed on a magneto-optical disc. As shown in FIG. 3, the file 1 is schematically composed of a header 21 including control information for controlling the video data and audio data, an image track 22 on which the motion pictorial image data having a plurality of frames per unit time are recorded for a predetermined period of time, and a sound track 23 on which audio data are recorded for a predetermined period of time corresponding to the image data.

The primary components of the apparatus will be explained.

Structure of File Production Processing Device 7

Figure 4:
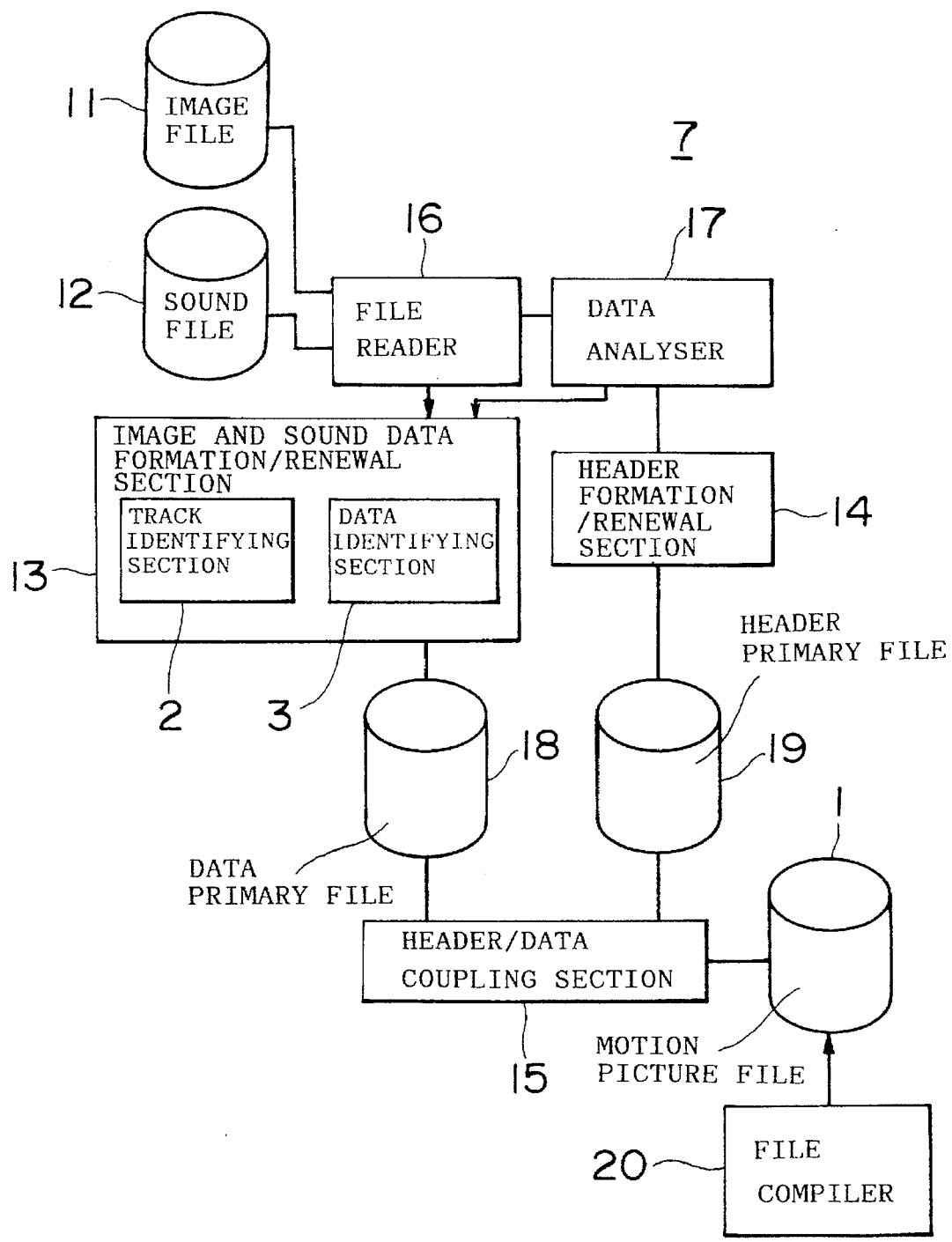
FIG. 4 is a block diagram showing a structure of a file production processing apparatus.

FIG. 4 is a block diagram showing a structure of the file production processing device 7. In FIG. 4, the apparatus is provided with an image file 11 onto which image data of motion picture having a plurality of frames per unit time have been recorded for a predetermined period of time, and a sound file 12 onto which audio data have been recorded for a predetermined period of time corresponding to the image data. The image file 11 and the sound file 12 are formed on a magneto-optical disc.

The device 7 further includes a file reader 16 for reading the image data of the image file 11 and the sound data of the sound file 12 and for supplying the data to a data analyzer 17 or an image/sound data formation/renewal section 13.

The above-described data analyzer 17 analyzes kinds of the image data and/or audio data from the file reader 16 and gives the analysis result to a header formation/renewal section 14 and the image data and sound data formation/renewal section 13.

The image data and sound data formation/renewal section 13 renews and forms the image data and sound data from the file reader 16 on the basis of the analysis result of the data analyzer 17, and includes a track identifying section 2 and a data identifying section 3.

The track identifying section 2 gives track identification numbers 1 and 2 for identifying the image track 22 and the sound track 23 to the above-described header 21 and the image data and sound data per unit time. The track identification number is an identifier to be uniquely given to the track which is present in the file 1. The identifiers are given to all the chunks (image data and sound data per unit time) of the tracks and become such that it allows recognition of which specific track the data belongs.

A data identifying section 3 gives data identifying numbers 01, 02, 03, . . . for representing the order of the data within the image track 22 or the sound track 23 to the image data and the sound data per unit time. In the apparatus, the same data identifying numbers are given to the image data and the sound data to be synchronized with the image data. Accordingly, in the file 1, the track identifying numbers and the data identifying numbers are imparted to the image data and the sound data per unit time by the track identifying section 2 and the data identifying section 3.

A header formation/renewal section 14 is adapted to form and/or renew a header, including control information such as positional information of the image data and sound data and the number of the data by the analysis result from the data analyzer 17 to form a header primary file 19.

A header/data coupling section 15 is adapted to couple the image data and sound data of the data primary file 18 and the header of the header primary file 19 to form the above-described file 1.

A file compiler 20 is adapted to delete a part of the image data and/or sound data recorded in the file 1 and replace the old data by new image data and/or sound data in the regions where the old data have been deleted.

In the case where the file compiler 20 replaces the old image data and/or sound data with the new image data and/or sound data, the track identifying section 2 and the data identifying section 3 assign the track identifying number and data identifying number previously assigned to the old image data and/or sound data.

Structure of File Reproduction Processing Device

Figure 5:
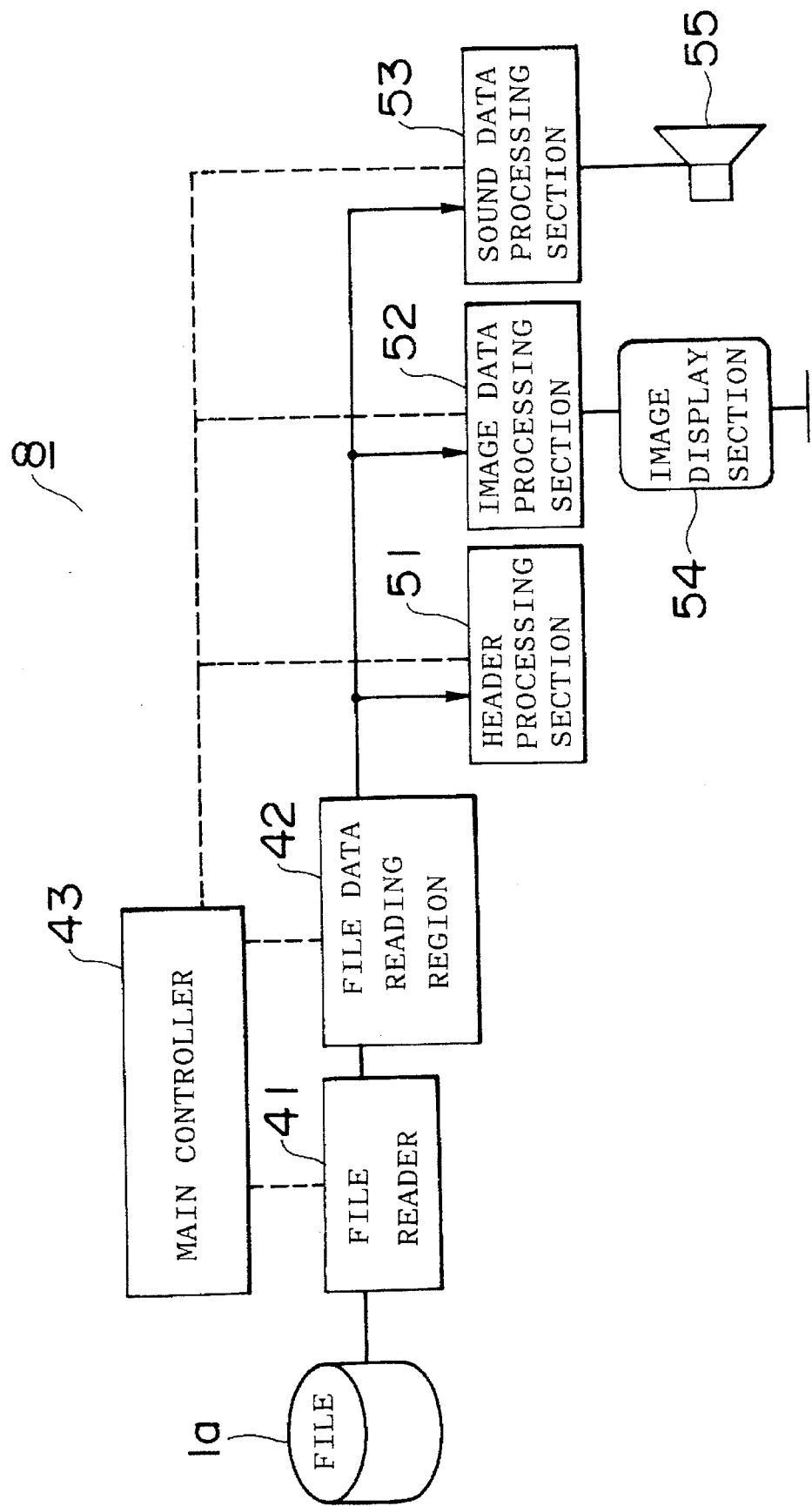
FIG. 5 is a block diagram showing a structure of a file reproduction processing apparatus.

FIG. 5 is a block diagram which shows a structure of a motion image reproduction processing device. In FIG. 5, the device 8 has a reader 41 for reading, in order, the image data and sound data from the file 1 on the basis of the control information of the header 21. The device 8 also has a file data reading region 42 on a main memory for storing the image data and sound data read out by the reader 41 for, for example, several seconds.

A main controller 43 is a microprocessor, for controlling the file reader 41 and at the same time reading, in synchronism, the image data and sound data to which the same data identifying numbers are given, with reference to the track identifying number and data identifying number given to the image and/or sound data within the file data reading region 42.

The device 8 has a header processing section 51 for analyzing the content of the header 21 stored in the file data reading region under the control of the main controller 43.

An image data processing section 52 has a V-RAM and/or a D/A converter for processing the reproduction of the image data stored in the file data reading region 42 and for outputting the process result to an image display section 54 such as a CRT (cathode ray tube) under the control of the main controller 43.

A sound data processing section 53 has a D/A converter for processing the reproduction of the sound data stored in the file data reading section 42 and for outputting the process result to a speaker 55 under the control of the main controller 43.

The operation of the structure according to the embodiment will be explained.

Formation Processing Flow for File 1

Figure 6:
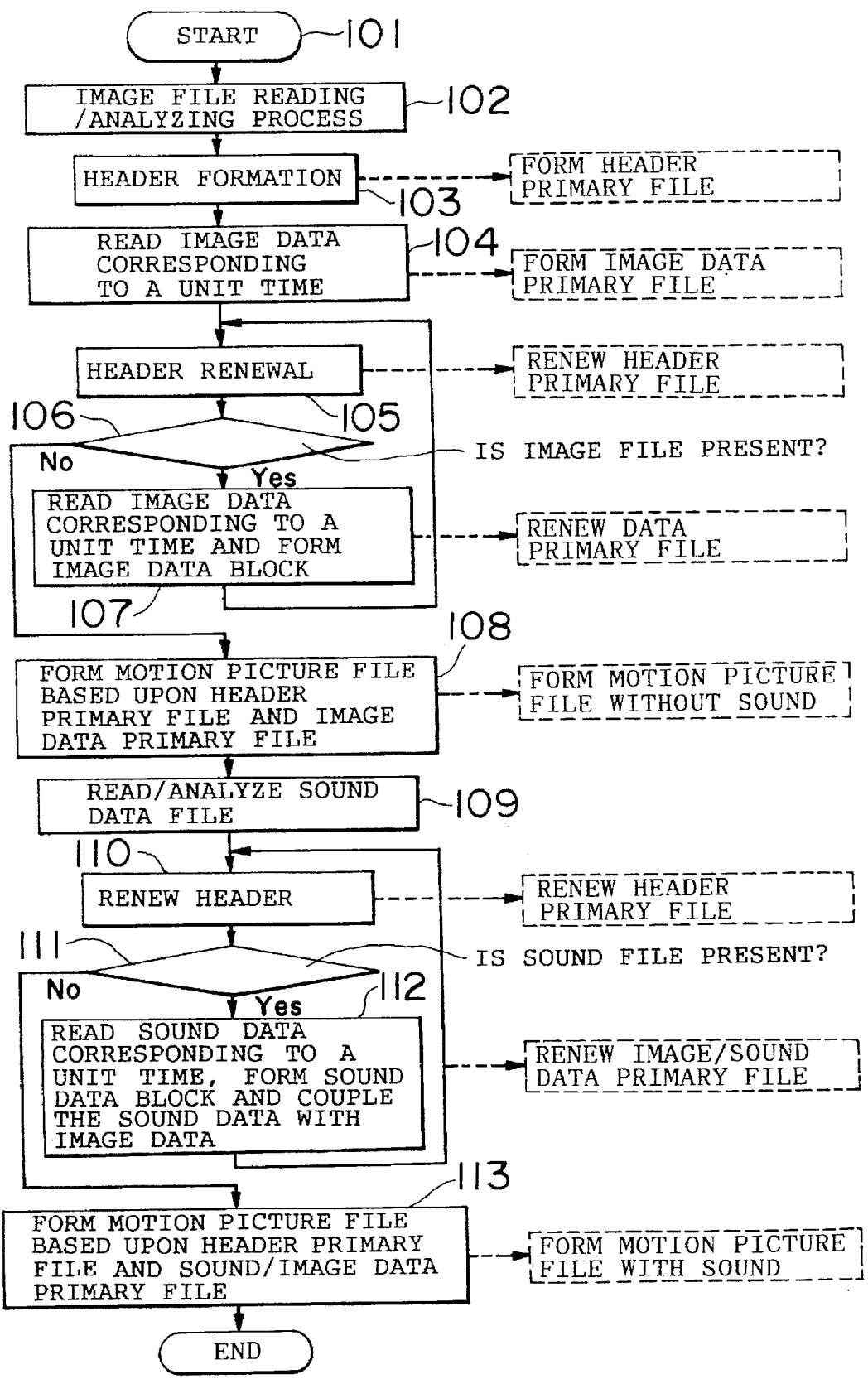
FIG. 6 is a flowchart showing the flow production.

FIG. 6 is a flowchart showing a formation process of the file 1. FIG. 7 is a view showing a format of the file 1 which is subjected to the formation process. The file formation process will be explained with reference to FIGS. 6 and 7.

When the process is started (step 101), the image data of the image file 11 are read out by the file reading region 16, and the read image data are processed for analysis by the data analyzer 17 (step 102).

Subsequently, based upon the analysis result by the data analyzer 17, the formation process of the header 21 is carried out by the header formation/renewal section 14 (step 103). The header primary file 19 (FIG. 4) is produced for the image header 21a (FIG. 7) including the track identifying number #1.

On the other hand, the image data of the file reading region 16 are read by the image/sound data formation/renewal section 13 for a unit time (one second) to carry out the image data block formation process (step 104). At this time, the track identifying section 2 imparts the track identifying number #1 to the image data for every unit time. The data identifying section 3 gives 01 in order of the data as the data identifying numbers. Then, the data primary file 18 is produced.

Subsequently, the header renewal process is carried out by the header formation/renewal section 14 (step 105). The header primary file 19 is renewed. In the image/sound data formation/renewal section 13, it is judged whether or not the non-processed image is present in the image file 11 (step 106).

In the case where the non-processed image is present in the image file 11, image data for next unit time are read, and the image data block formation process is carried out. At this time, the track identifying section 2 and the data identifying section 3 impart the track identifying number #1 and the data identifying number 02 in order of the data to the image data for every unit time.

The data primary file 18 is renewed (step 107). Returning back to the step 105, the process of the steps 105 to 107 is repetitively carried out. The track identifying number #1 is given to the image data for every unit time, and at the same time, the data identifying number is given thereto by incrementing the number (+1).

On the other hand, if the non-processed image is not present in the image file 11, the header 21 of the header primary file 19 and the image data of the data primary file 18 are coupled with each other by the header/data coupler 15, to thereby form a file 1 of only image data (step 108).

Subsequently, the file reader 16 read the sound data of the sound file 12 and the data analyzer 17 processes the read sound data for analysis (step 109).

Next, based upon the analysis by the data analyzer 17, the header renewal process is carried out by the header formation/renewal section 14 (step 110) to form the sound header 21b including the track identifying number #2 to renew the header primary file 19.

Subsequently, the image/sound data formation/renewal section 13 judges whether or not the non-processed sound is present in the sound file 12 (step 111).

If the non-processed sound is present in the sound file 12, the sound data for unit time is read and the sound data block formation process is carried out. In this case, the track identifying section 2 gives the track identifying number #2 to the sound data for every unit time. The data identifying section 3 gives 01 in order of the data.

Then, the sound data and the image data are coupled with each other (step 112). The data primary file 18 is renewed. Returning back to the step 110, the process of the steps 110 to 112 is repetitively carried out. The track number #2 is given to the sound data for every unit time, and the incremented data identifying number is given.

On the other hand, if the non-processed sound is not present, the header of the header primary file 19 and the image data of the data primary file 18 are coupled with each other by the header/data coupler 15 to form a file 1 (step 113).

Thus, the file 1 having a format as shown in FIG. 7 is produced. Image header #1-00, sound header #2-00, sound data #2-01 for next unit time, sound data #2-02, image data #1-01, sound data #2-03, image data #1-02 and image data #1-03 are recorded in the file 1 shown in FIG. 7.

Figure 8:
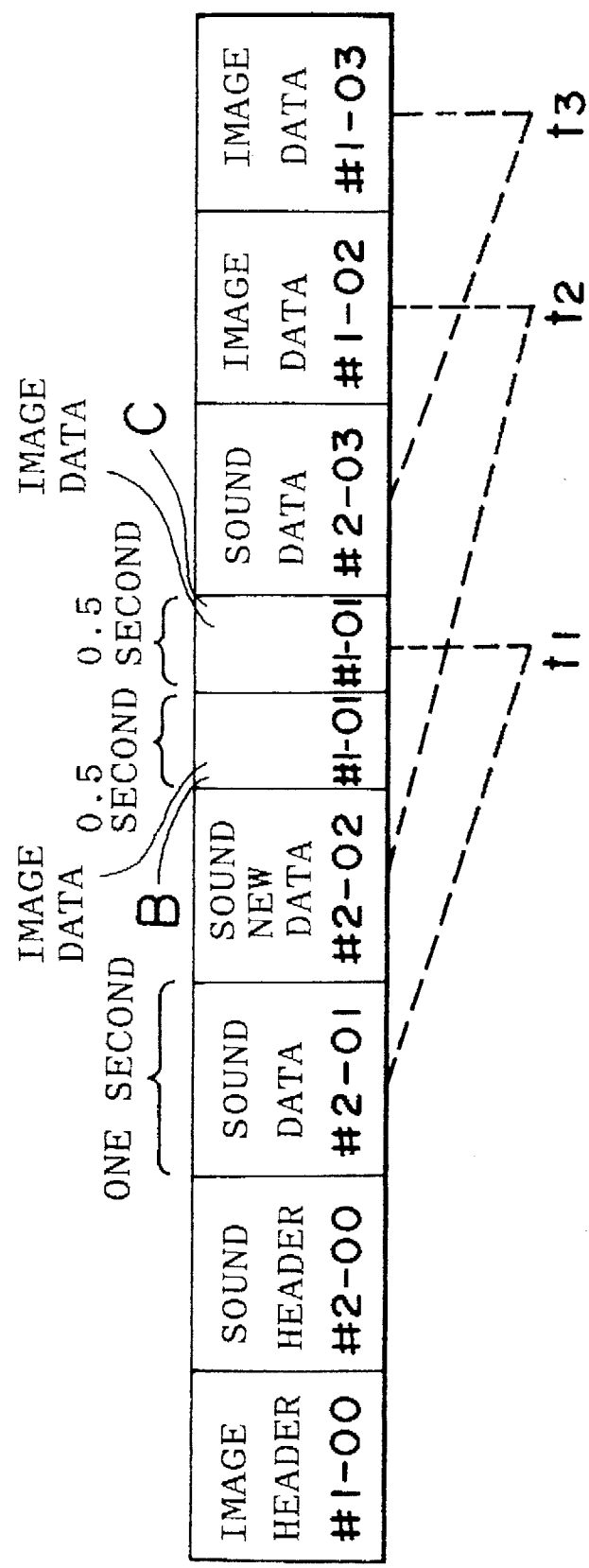
FIG. 8 is a diagram showing the file-compiled file format.

Subsequently, the image data corresponding to 0.5 seconds from the leading portion of the image data #1-01 in the region A within the file 1 shown in FIG. 7 are deleted. New image data are inserted into a region B corresponding to 0.5 seconds from the leading portion as shown in FIG. 8. At this time, the track identifying number #1 and the data identifying number 01 given to the old image data are imparted to the new image data by using the track identifying section 2 and the data identifying section 3 illustrated in FIG. 4. Thus, the format of the file 1a compiled by the file compiler 20 is one shown in FIG. 8.

Motion Picture File Reproduction Process Flowchart

Figure 9:
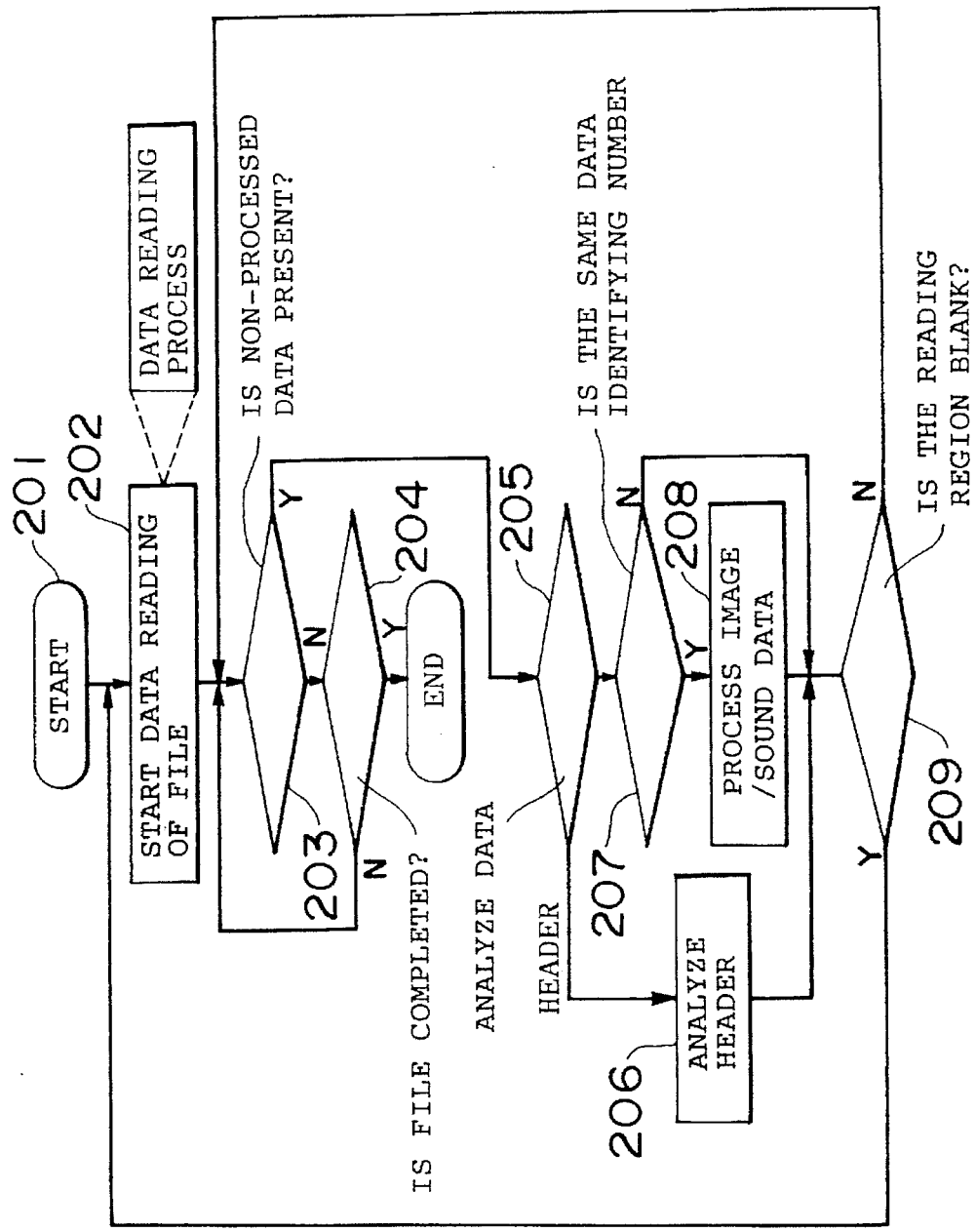
FIG. 9 is a flowchart showing the file reproduction process.

FIG. 9 is a flowchart showing a file reproduction process. The process will be explained with reference to FIG. 9. The reproduction of the image data and sound data of the file 1a compiled by the file compiler 20 is now explained.

The process is started (step 201). The reading operation of the image data and the sound data into the file data reading region 42, in the order recorded from the file 1a by the file reader 41, is started under the control of the main controller 43 (step 202).

Subsequently, the main controller judges whether or not the non-processed data are present in the file data reading region 42 (step 203). If the non-processed data are present, the content of the data is analyzed (step 205). In this case, if the data are control information of the header 21, the header analysis process is carried out by the header processing section 51 (step 206).

Then, it is judged whether or not the file data reading region 42 has a blank (step 209). If this region 42 is full, the process of the step 203 is carried out. If this region 42 has a blank, the process of the step 205 is carried out. If the analyzed data are the image data or sound data, it is judged whether or not the data identifying number of the image data are identified with the data identifying number of the sound data (step 207).

If the data identifying numbers are not identified with each other, the process of the steps 209, 203 and 205 is repetitively carried out. At the time when the data identifying number of the image data is identified with the data identifying number of the sound data, the image data and sound data are read in synchronism from the region 42.

For example, in the example shown in FIG. 8, at the time t1, the sound data #2-01 for one second and the new image data #1-01 for 0.5 seconds and the image data #1-01 for 0.5 seconds are read in synchronism.

The image data display process is carried out by the image data processing section 52 to display the image data on the image display section 54. Also, the sound reproduction process is carried out in synchronism with the image reproduction process by the sound data processing section 53 to output the sound data to the speaker 55 (step 208).

Subsequently, the new image data #1-01, the image data #1-01 and the sound data #2-01 have been read out so that the reading region 42 has a blank in the process of the step 209. Then, returning back to the step 202, the process following the step 202 is repetitively carried out.

Further, in the example shown in FIG. 8, at time t2, the sound data #2-02 for one second and the image data #1-02 for one second are read in synchronism.

The image data display process is carried out by the image data processing section 52, and the image data are displayed on the image display section 54. In synchronism with the image reproduction, the sound reproduction process is carried out by the sound data processing section 53 to output the sound data to the speaker 55 (step 208). Further, at time t3, the sound data #2-03 for one second and the image data #1-03 for one second are read in synchronism.

Then, the image data display process is carried out by the image data processing section 52, and the data are displayed on the image display section 54. In synchronism with the image reproduction, the sound reproduction process is carried out by the sound data processing section 53 to output the sound data to the speaker 55 (step 208).

In the step 203, it is judged whether or not the non-processed data are present. If the non-processed data are not present, that is, the file 1a is completed (step 204), the process is finished.

Thus, according to this embodiment, when the image data and the sound data are recorded in the file 1a, the track identifying number and the data identifying number are imparted to the respective data and the image data and sound data recorded in the file 1a are reproduced in synchronism. The number of the files to be controlled may be single to simplify the file control and to facilitate the program formation.

Also, the file compiler 20 is provided for compiling the process of the file 1. In the case where the file compiler 20 replaces the old image and/or sound data with new image and/or sound data, the track identifying number and data identifying number given to the old image data and/or sound data are given to the new image data and/or sound data by the track identifying section 2 and the data identifying section 3, whereby it is possible to synchronously reproduce the compiled image data and sound data.

According to the present invention, when the image data and sound data are recorded in the file, the track identifying number and the data identifying number are imparted to the respective data, and the image and sound data recorded in a single file may be synchronously reproduced. Therefore, the number of the files to be controlled may be one to simplify the file control and in addition to facilitate the program formation.

What is claimed is:

1. A motion picture reproducing apparatus using a computer, comprising:
   a file in a memory unit of the computer, including
      an image track of image data, included in a plurality of frames for a unit time, recorded for a period of time extending at least one unit time,
      a sound track of sound data recorded for the period of time, corresponding to said image data, and
      a header including control information for controlling transfer of said image data and said sound data, said header stored as a separate track from said image and said sound tracks, said control information indicating a relationship between said image data and said sound data, said image and sound tracks not corresponding one-to-one to physical tracks of a recording disk;
   track identifying means for imparting, to said image data and said sound data for each unit time, track identifying numbers for identifying either said image track or said sound track;
   data identifying means for imparting, to said image data and said sound data for said each unit times, a respective data identifying number representative of an order of data within said image track and said sound track;
   data synchronizing means for reading, in order, said image data and said sound data from said file in response to the control information of said header, and at the same time for synchronously outputting said image data and said sound data to which the same data identifying numbers have been imparted with reference to the track and data identifying numbers of said image and sound data; and
   reproduction means for reproducing said image data and said sound data which have been synchronized by said data synchronizing means.

2. The apparatus according to claim 1, further comprising:
   image data storage for storing, for a predetermined period of time, said image data included in a plurality of frames for said unit time;

sound data storage for storing said sound data corresponding to said image data for said predetermined period of time;

data forming means for forming said image track from said image data for said predetermined period of time of said image data storage, and simultaneously for forming said sound track from said sound data for said predetermined period of time of said sound data storage;

header forming means for forming said header; and coupling means for coupling said header, said image data from said image track and said sound data from said sound track to form said file.

3. The apparatus according to claim 1, wherein said data synchronizing means includes:

reading means for reading said image data and sound data from said file;

memory means for storing said image data and said sound data which have been read out by said reading means; and control means for reading, in synchronism, said image data and said sound data to which the same data identifying numbers have been imparted with reference to said track and data identifying numbers stored in said memory means, and for outputting said image data and said sound data to said reproduction means.

4. The apparatus according to claim 1, further comprising file compiling means for compiling and processing said file, wherein, when said image data and said sound data are replaced by at least one of new image data and new sound data, said file compiling means commanding said track identifying means and said data identifying means so that said track and data identifying numbers which have been given to the at least one of replaced image data and replaced sound data, are imparted to the at least one of said new image data and said new sound data.

5. A motion picture reproducing apparatus comprising:

a computer file comprising:

an image track in which image data, included in a plurality of frames for a unit time, has been recorded for a predetermined period of time, said predetermined period of time comprising at least one unit time, a sound track in which sound data have been recorded for said predetermined period of time, corresponding to said image data, and a header including control information for controlling transfer of said image data and said sound data, said header being a separate track than said image and said sound tracks, said control information indicating a relationship between said image data and said sound data, said image and sound tracks not corresponding one-to-one to physical tracks of a recording disk;

track identifying means for imparting, to said image data and said sound data for each unit time, track identifying numbers for identifying either said image track or said sound track;

data identifying means for imparting, to said image data and said sound data for said each unit times, a respective data identifying number representative of an order of data within said image track and said sound track;

data synchronizing means for reading, in order, said image data and said sound data from said file in response to the control information of said header, and at the same time for synchronously outputting said image data and said sound data to which the same data identifying number has been imparted with reference to the track and data identifying numbers of said image and sound data;

reproduction means for reproducing said image data and said sound data which have been synchronized by said data synchronizing means;

image data storage for storing, for a predetermined period of time, said image data included in a plurality of frames for said unit time;

sound data storage for storing said sound data corresponding to said image data for said predetermined period of time;

data forming means for forming said image track from said image data for said predetermined period of time of said image data storage, and simultaneously for forming said sound track from said sound data for said predetermined period of time of said sound data storage;

header forming means for forming said header; and coupling means for coupling said header, said image data from said image track and said sound data from said sound track to form said computer file.

6. A motion picture reproducing apparatus comprising:

a computer file comprising:

an image portion in which image data, included in a plurality of frames for a unit time, has been recorded for a predetermined period of time, said predetermined period of time comprising at least one unit time, a sound portion in which sound data have been recorded for said predetermined period of time, corresponding to said image data, and a header including control information for controlling transfer of said image data and said sound data, said header being a separate track than said image and said sound tracks, said control information indicating a relationship between said image data and said sound data, said image and sound tracks not corresponding one-to-one to physical tracks of a recording disk;

portion identifying means for imparting, to said image data and said sound data for each unit time, portion identifying numbers for identifying either said image portion or said sound portion;

data identifying means for imparting, to said image data and said sound data for said each unit times, a respective data identifying number representative of an order of data within said image track and said sound track;

data synchronizing means for reading, in order, said image data and said sound data from said computer file in response to the control information of said header, and at the same time for synchronously outputting said image data and said sound data to which the same data identifying number has been imparted with reference to the portion and data identifying numbers of said image and sound data; and reproduction means for reproducing said image data and said sound data which have been synchronized by said data synchronizing means.

* * * * *